(12) United States Patent
Wang et al.

(10) Patent No.: US 12,326,996 B2
(45) Date of Patent: *Jun. 10, 2025

(54) SYSTEM AND MACHINE LEARNING METHOD FOR SEPARATING NOISE AND SIGNAL IN MULTITOUCH SENSORS

(71) Applicant: Apple Inc., Cupertino, CA (US)

(72) Inventors: Lichen Wang, San Jose, CA (US); Behrooz Shahsavari, Los Altos Hills, CA (US); Hojjat Seyed Mousavi, San Jose, CA (US); Nima Ferdosi, San Jose, CA (US); Baboo V. Gowreesunker, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,255

(22) Filed: Apr. 8, 2024

(65) Prior Publication Data

US 2024/0345683 A1 Oct. 17, 2024

Related U.S. Application Data

(63) Continuation of application No. 17/406,990, filed on Aug. 19, 2021, now Pat. No. 11,954,288.

(Continued)

(51) Int. Cl.
*G06F 3/041* (2006.01)
*G06F 3/044* (2006.01)
(Continued)

(52) U.S. Cl.
CPC .......... *G06F 3/04182* (2019.05); *G06F 3/044* (2013.01); *G06N 3/044* (2023.01); *G06N 3/08* (2013.01); *G06F 2203/04104* (2013.01)

(58) Field of Classification Search
CPC .. G06F 3/04182; G06F 3/0418; G06F 3/0446; G06F 3/0412; G06F 3/0443;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002
WO 2017/151757 A1 9/2017

OTHER PUBLICATIONS

Corrected Notice of Allowability received for U.S. Appl. No. 17/123,015, mailed on Oct. 19, 2023, 2 pages.
(Continued)

*Primary Examiner* — Jimmy H Nguyen
(74) *Attorney, Agent, or Firm* — Kubota & Basol LLP

(57) ABSTRACT

In some examples, touch data can include noise. Machine learning techniques, such as gated recurrent units and convolutional neural networks can be used to mitigate noise present in touch data. In some examples, a gated recurrent unit stage and a convolutional neural network stage can be arranged in series, such as by providing the output of the gated recurrent unit as input to the convolutional neural network. The gated recurrent unit can remove noise caused by a first component of the electronic device and the convolutional neural network can remove noise caused by a second component of the electronic device, for example. Thus, together, the gated recurrent unit and the convolutional neural network can remove or substantially reduce the noise in the touch data.

20 Claims, 10 Drawing Sheets

Related U.S. Application Data

(60) Provisional application No. 63/070,779, filed on Aug. 26, 2020.

(51) Int. Cl.
 *G06N 3/044* (2023.01)
 *G06N 3/08* (2023.01)

(58) Field of Classification Search
 CPC . G06F 3/044; G06F 2203/04104; G06N 3/08; G06N 3/044
 USPC .................................................. 345/173, 174
 See application file for complete search history.

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,520,913 B2 | 8/2013 | Dean et al. |
| 9,098,148 B2 | 8/2015 | Sharma |
| 9,146,630 B2 | 9/2015 | Choi et al. |
| 9,164,618 B2 | 10/2015 | Perski et al. |
| 9,244,545 B2 | 1/2016 | Hinckley et al. |
| 9,256,321 B2 | 2/2016 | Wang et al. |
| 9,558,455 B2 | 1/2017 | Johnson et al. |
| 9,904,412 B2 | 2/2018 | Stevenson et al. |
| 10,261,685 B2 | 4/2019 | Deselaers et al. |
| 10,345,970 B2 | 7/2019 | Qiao et al. |
| 10,928,955 B1 | 2/2021 | Reed et al. |
| 11,481,070 B1 | 10/2022 | Ganjali et al. |
| 11,599,223 B1 | 3/2023 | Gowreesunker et al. |
| 11,954,288 B1 | 4/2024 | Lichen et al. |
| 2006/0197753 A1 | 9/2006 | Hotelling |
| 2006/0214921 A1 | 9/2006 | Takahashi et al. |
| 2007/0257890 A1 | 11/2007 | Hotelling et al. |
| 2012/0056846 A1 | 3/2012 | Zaliva |
| 2012/0113064 A1 | 5/2012 | White et al. |
| 2012/0194452 A1 | 8/2012 | Cho et al. |
| 2012/0249433 A1 | 10/2012 | Deng et al. |
| 2013/0222290 A1 | 8/2013 | Choi et al. |
| 2014/0028621 A1 | 1/2014 | Hotelling et al. |
| 2014/0062949 A1 | 3/2014 | Chang et al. |
| 2014/0071360 A1 | 3/2014 | Chang et al. |
| 2014/0118297 A1 | 5/2014 | Huang et al. |
| 2014/0204058 A1 | 7/2014 | Huang et al. |
| 2014/0267132 A1 | 9/2014 | Rabii et al. |
| 2015/0091850 A1 | 4/2015 | Morein et al. |
| 2015/0242009 A1 | 8/2015 | Xiao et al. |
| 2015/0293621 A1 | 10/2015 | Singh et al. |
| 2016/0196003 A1 | 7/2016 | Yoon et al. |
| 2016/0291792 A1 | 10/2016 | Sawahata et al. |
| 2016/0309307 A1 | 10/2016 | Agarwal et al. |
| 2016/0357315 A1 | 12/2016 | Huang et al. |
| 2017/0003785 A1 | 1/2017 | Berget et al. |
| 2017/0090668 A1 | 3/2017 | Agarwal et al. |
| 2017/0090670 A1 | 3/2017 | Stevenson et al. |
| 2017/0139527 A1 | 5/2017 | Nathan et al. |
| 2017/0192604 A1 | 7/2017 | Stevenson et al. |
| 2017/0285804 A1 | 10/2017 | Li et al. |
| 2018/0059852 A1 | 3/2018 | Sterling et al. |
| 2018/0129311 A1 | 5/2018 | Westhues et al. |
| 2018/0188938 A1 | 7/2018 | Deselaers et al. |
| 2018/0329542 A1 | 11/2018 | Forlines et al. |
| 2018/0348949 A1 | 12/2018 | Kim et al. |
| 2019/0079634 A1 | 3/2019 | Kravets et al. |
| 2019/0122076 A1 | 4/2019 | Sen et al. |
| 2020/0142532 A1 | 5/2020 | Kravets et al. |
| 2020/0210045 A1 | 7/2020 | Mohamed et al. |
| 2020/0241691 A1 | 7/2020 | Kobayashi |
| 2021/0191563 A1 | 6/2021 | Reed et al. |
| 2021/0397327 A1 | 12/2021 | Lee |
| 2022/0019311 A1 | 1/2022 | Seyed Mousavi et al. |
| 2023/0016448 A1 | 1/2023 | Ganjali et al. |

OTHER PUBLICATIONS

Ex Parte Quayle Action received for U.S. Appl. No. 17/249,791, mailed on Jan. 5, 2022, 8 pages.
Final Office Action received for U.S. Appl. No. 16/107,037, mailed on Jan. 13, 2020, 17 pages.
Final Office Action received for U.S. Appl. No. 17/123,015, mailed on Apr. 13, 2023, 14 pages.
Final Office Action received for U.S. Appl. No. 17/406,990, mailed on Apr. 4, 2023, 13 pages.
Non-Final Office Action received for U.S. Appl. No. 16/107,037, mailed on Jul. 30, 2019, 15 pages.
Non-Final Office Action received for U.S. Appl. No. 17/123,015, mailed on Oct. 27, 2022, 12 pages.
Non-Final Office Action received for U.S. Appl. No. 17/249,791, mailed on Apr. 12, 2022, 12 pages.
Non-Final Office Action received for U.S. Appl. No. 17/406,990, mailed on Sep. 28, 2022, 9 pages.
Non-Final Office Action received for U.S. Appl. No. 17/933,974, mailed on Mar. 2, 2023, 19 pages.
Non-Final Office Action received for U.S. Appl. No. 16/107,037, mailed on May 6, 2020, 20 pages.
Notice of Allowance received for U.S. Appl. No. 16/107,037, mailed on Oct. 22, 2020, 9 pages.
Notice of Allowance received for U.S. Appl. No. 17/123,015, mailed on Oct. 10, 2023, 8 pages.
Notice of Allowance received for U.S. Appl. No. 17/177,977, mailed on Nov. 4, 2021, 9 pages.
Notice of Allowance received for U.S. Appl. No. 17/249,791, mailed on Nov. 7, 2022, 11 pages.
Notice of Allowance received for U.S. Appl. No. 17/406,990, mailed on Aug. 15, 2023, 11 pages.
Notice of Allowance received for U.S. Appl. No. 17/406,990, mailed on Dec. 7, 2023, 8 pages.
Notice of Allowance received for U.S. Appl. No. 17/463,195, mailed on Jun. 10, 2022, 11 pages.
Notice of Allowance received for U.S. Appl. No. 17/933,974, mailed on Aug. 21, 2023, 12 pages.
Aggarwal, C. C., "An Introduction to Neural Networks", Neural Networks and Deep Learning. Springer, Cham, Available Online at: <https://doi.org/10.1007/978-3-319-94463-0_1>, 2018, pp. 1-52.
Aggarwal, C. C., "Convolutional Neural Networks", Neural Networks and Deep Learning. Springer, Cham, Available online at: <https://doi.org/10.1007/978-3-319-94463-0_8>, 2018, pp. 315-371.
Aggarwal, C. C., "Recurrent Neural Networks", Neural Networks and Deep Learning. Springer, Cham, Available online at: <https://doi.org/10.1007/978-3-319-94463-0_7>, 2018, pp. 271-313.
Le, Huy V., "Hand-and-Finger-Awareness for Mobile Touch Interaction using Deep Learning", University of Suttgart, Germany, 2019, 258 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

SYSTEM AND MACHINE LEARNING METHOD FOR SEPARATING NOISE AND SIGNAL IN MULTITOUCH SENSORS

CROSS-REFERENCE TO RELATED APPLICATIONS

This application is a continuation of U.S. application Ser. No. 17/406,990, filed Aug. 19, 2021, which claims the benefit of U.S. Provisional Application No. 63/070,779, filed Aug. 26, 2020, the contents of which are hereby incorporated by reference in their entireties for all purposes.

FIELD OF THE DISCLOSURE

This relates generally to mitigating noise present in touch data and, more specifically, to using machine learning, including a gated recurrent unit stage and a convolutional neural network stage, to mitigate noise present in touch data.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some examples, touch data can include noise caused by one or more other components of the electronic device, such as the display, the power system, or other components. Noise can be mitigated by designing the electronic device such that the touch sensing system is shielded from the other components of the electronic device, for example. In some examples, however, such as for portable electronic devices, the addition of shielding materials can be undesirable. In some examples, noise can be mitigated through post-processing algorithms that reduce or remove the noise from the touch data.

BRIEF SUMMARY OF THE DISCLOSURE

This relates generally to mitigating noise present in touch data and, more specifically, to using machine learning, including a gated recurrent unit stage and a convolutional neural network stage, to mitigate noise present in touch data. In some examples, the gated recurrent unit stage and the convolutional neural network stage can be arranged in series, such as by providing the output of the gated recurrent unit as input to the convolutional neural network. The gated recurrent unit can remove noise caused by a first component of the electronic device and the convolutional neural network can remove noise caused by a second component of the electronic device, for example. In some examples, the gated recurrent unit can include a plurality of layers and/or the electronic device can remove noise using the gated recurrent unit multiple times per frame of touch data (e.g., removing noise iteratively). Thus, together, the gated recurrent unit and the convolutional neural network can remove or substantially reduce the noise in the touch data.

In some examples, each electronic device can be calibrated at the factory prior to shipping. For example, while there are no objects touching the touch screen of the electronic device, the electronic device can display a series of images and touch signals, which can be noise coupled from the display to the touch circuitry, can be sensed. The noise data can be analyzed to determine characteristic vectors that, when linearly combined using coefficients, can result in close approximations of most, substantially all, or all patterns of noise that can be coupled from the display to the touch circuitry, for example. In some examples, characteristic vectors can be obtained for each individual electronic device. In some examples, the electronic device obtains and stores a plurality of characteristic vectors that can be linearly combined to result in the noise in the touch data for any of the sense lines of the electronic device. In some examples, the electronic device obtains and stores a plurality of characteristic vectors that can be linearly combined to result in the noise in the touch data for each individual sense line of the electronic device.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to mitigating noise present in touch data and, more specifically, to using machine learning, including a gated recurrent unit stage and a convolutional neural network stage, to mitigate noise present in touch data. In some examples, the gated recurrent unit stage and the convolutional neural network stage can be arranged in series, such as by providing the output of the gated recurrent unit as input to the convolutional neural network. The gated recurrent unit can remove noise caused by a first component of the electronic device and the convolutional neural network can remove noise caused by a second component of the electronic device, for example. In some examples, the gated recurrent unit can include a plurality of layers and/or the electronic device can remove noise using the gated recurrent unit multiple times per frame of touch data (e.g., removing noise iteratively). Thus, together, the gated recurrent unit and the convolutional neural network can remove or substantially reduce the noise in the touch data.

In some examples, each electronic device can be calibrated at the factory prior to shipping. For example, while there are no objects touching the touch screen of the electronic device, the electronic device can display a series of images and touch signals, which can be noise coupled from the display to the touch circuitry, can be sensed. The noise data can be analyzed to determine characteristic vectors that, when linearly combined using coefficients, can result in close approximations of most, substantially all, or all patterns of noise that can be coupled from the display to the touch circuitry, for example. In some examples, characteristic vectors can be obtained for each individual electronic device. In some examples, the electronic device obtains and stores a plurality of characteristic vectors that can be linearly combined to result in the noise in the touch data for any of the sense lines of the electronic device. In some examples, the electronic device obtains and stores a plurality of characteristic vectors that can be linearly combined to result in the noise in the touch data for each individual sense line of the electronic device.

Figure 1A:
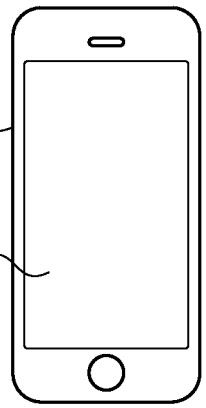
FIGS. 1A-1F illustrate example systems that can use noise removal techniques according to examples of the disclosure.
Figure 1B:
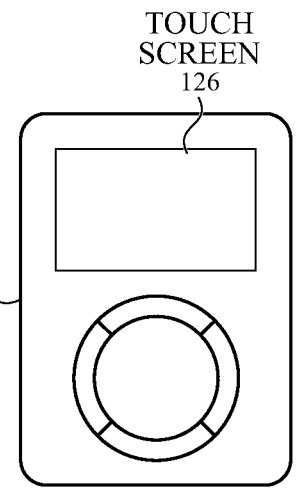
Figure 1C:
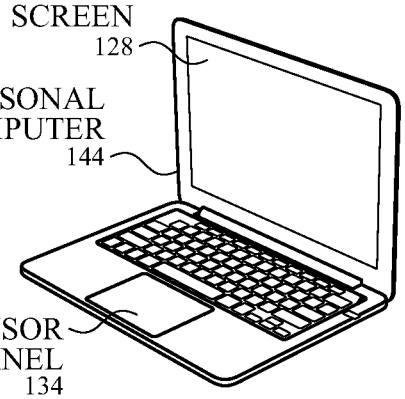
Figure 1D:
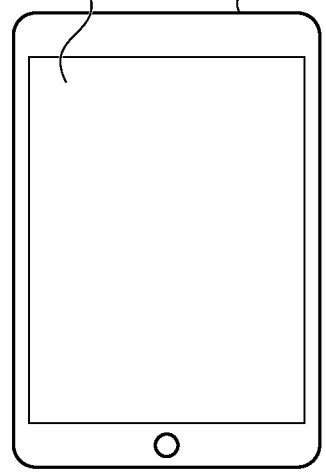
Figure 1E:
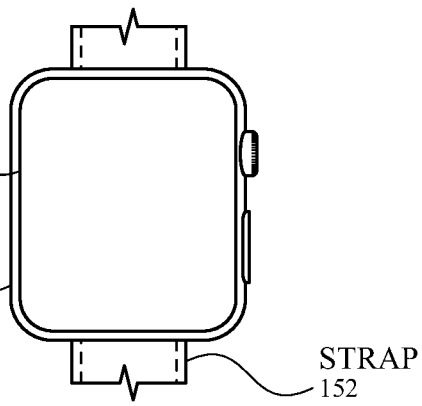
Figure 1F:
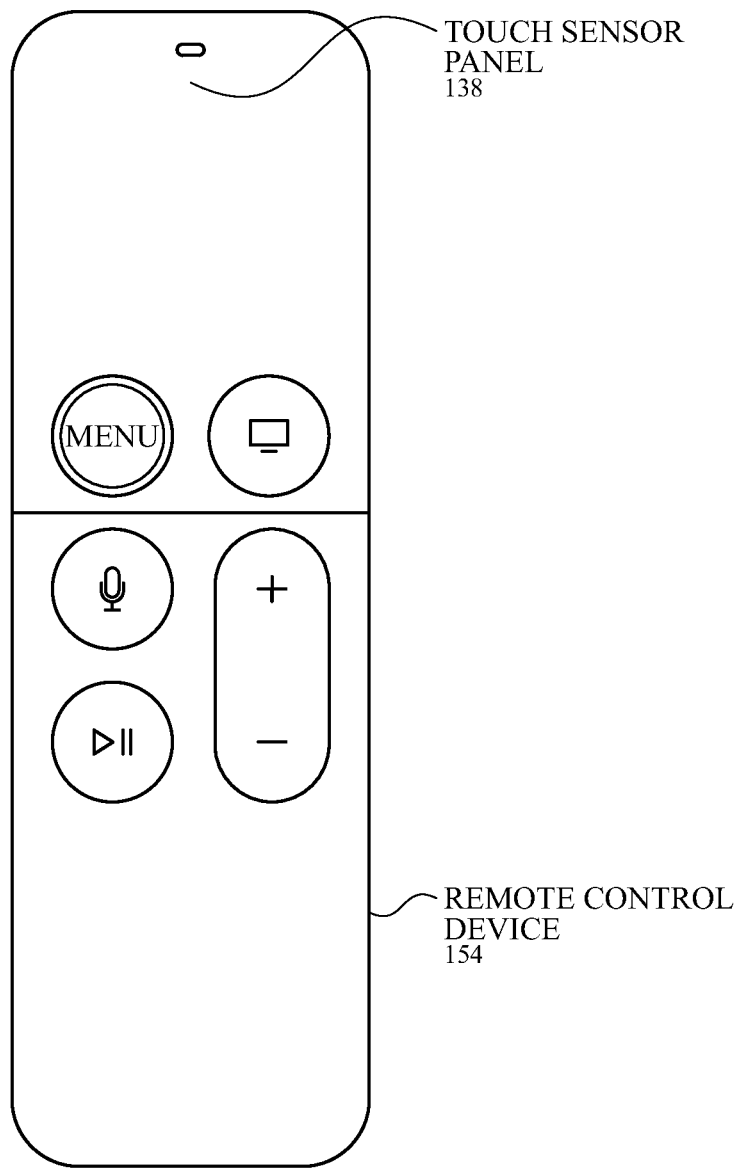

FIGS. 1A-1F illustrate example systems that can use noise removal techniques according to examples of the disclosure. FIG. 1A illustrates an example mobile telephone 136 that includes a touch screen 124 that can use noise removal techniques according to examples of the disclosure. FIG. 1B illustrates an example digital media player 140 that includes a touch screen 126 that can use noise removal techniques according to examples of the disclosure. FIG. 1C illustrates an example personal computer 144 that includes a touch screen 128 and a touch sensor panel 134 (e.g., a trackpad) that can use noise removal techniques according to examples of the disclosure. FIG. 1D illustrates an example tablet computing device 148 that includes a touch screen 130 that can use noise removal techniques according to examples of the disclosure. FIG. 1E illustrates an example wearable device 150 that includes a touch screen 132 and can be attached to a user using a strap 152 and that can use noise removal techniques according to examples of the disclosure. FIG. 1F illustrates an example remote control device 154 that includes a touch sensor panel 138 that can use glove touch detecting techniques according to examples of the disclosure. It is understood that a touch screen and noise removal techniques can be implemented in other devices, including future devices not yet in the marketplace. Additionally, it should be understood that although the disclosure herein primarily focuses on touch screens, the disclosure of noise removal techniques can be implemented for devices including touch sensor panels (and displays) that may not be implemented as a touch screen.

In some examples, touch screens 124, 126, 128, 130 and 132 and touch sensor panels 134 and 138 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 and touch sensor panels 134 and 138 can be based on mutual capacitance. A mutual capacitance based touch system can include electrodes arranged as drive and sense lines (e.g., as described below with reference to FIG. 4A) that may cross over each other on different layers (in a double-sided configuration) or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 and touch sensor panels 134 and 138 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
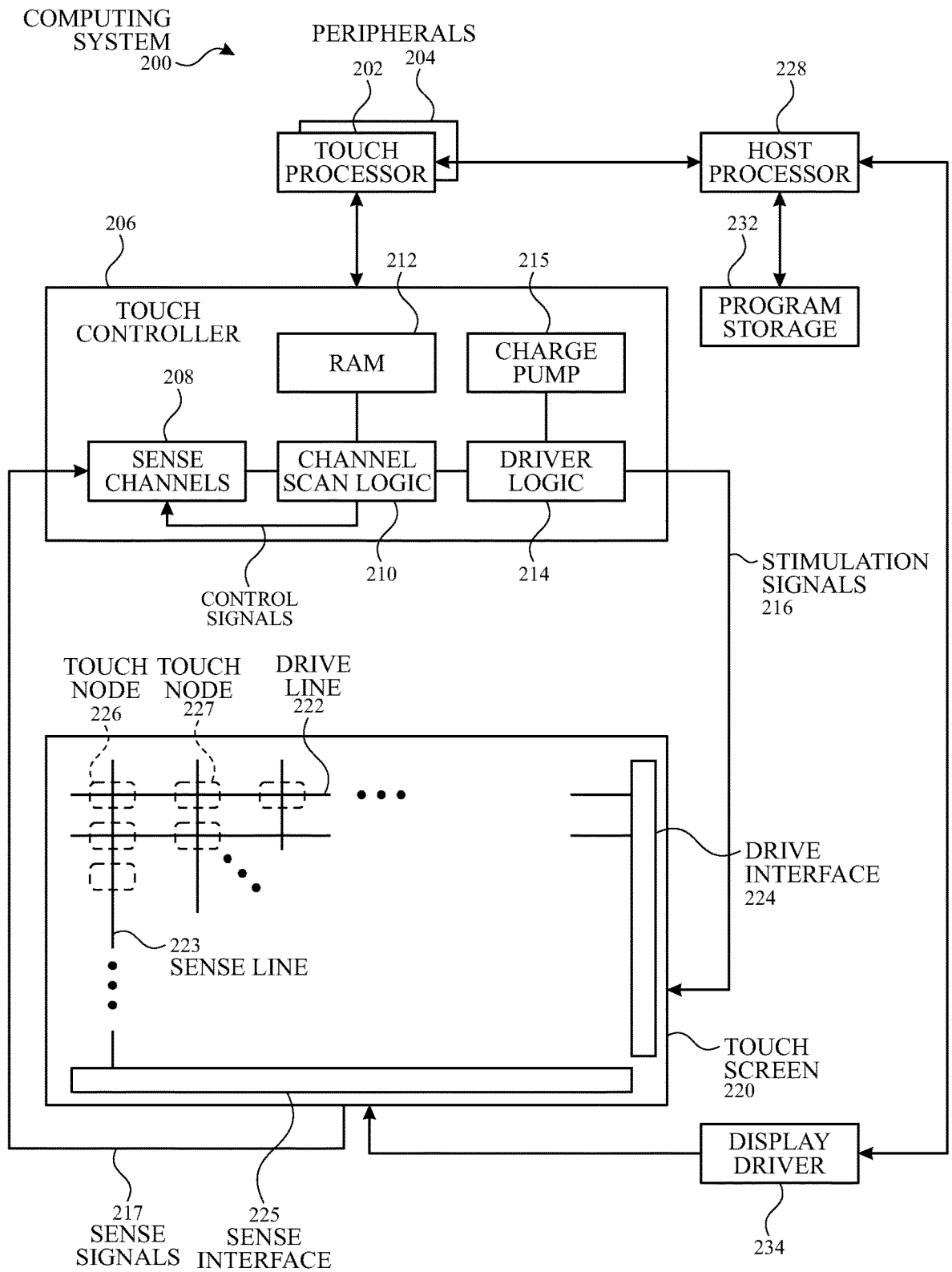
FIG. 2 illustrates an example computing system including a touch screen that can use noise removal techniques according to examples of the disclosure.

FIG. 2 illustrates an example computing system including a touch screen that can use noise removal techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers, co-processor(s) and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, capturing an image with a camera in communication with the electronic device, exiting an idle/sleep state of the electronic device, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224 and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
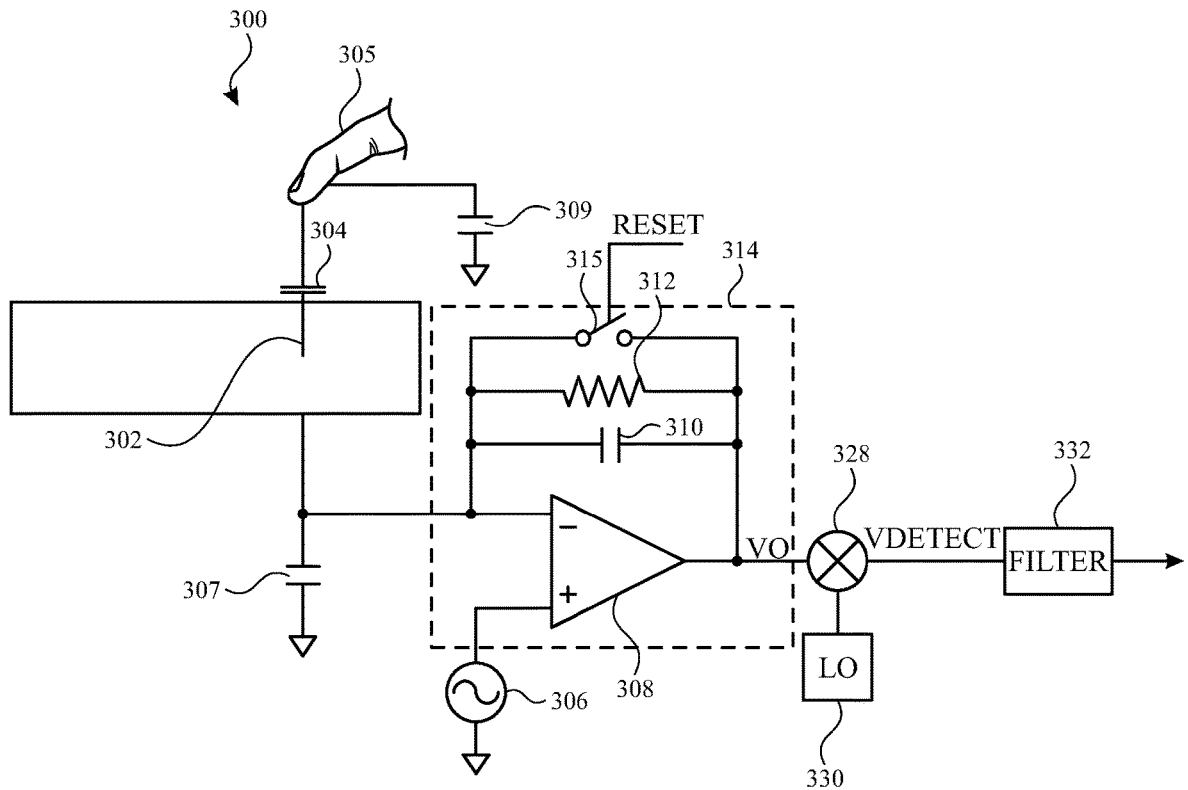
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discreet logic network to determine the presence of a proximity or touch event.

Figure 3B:
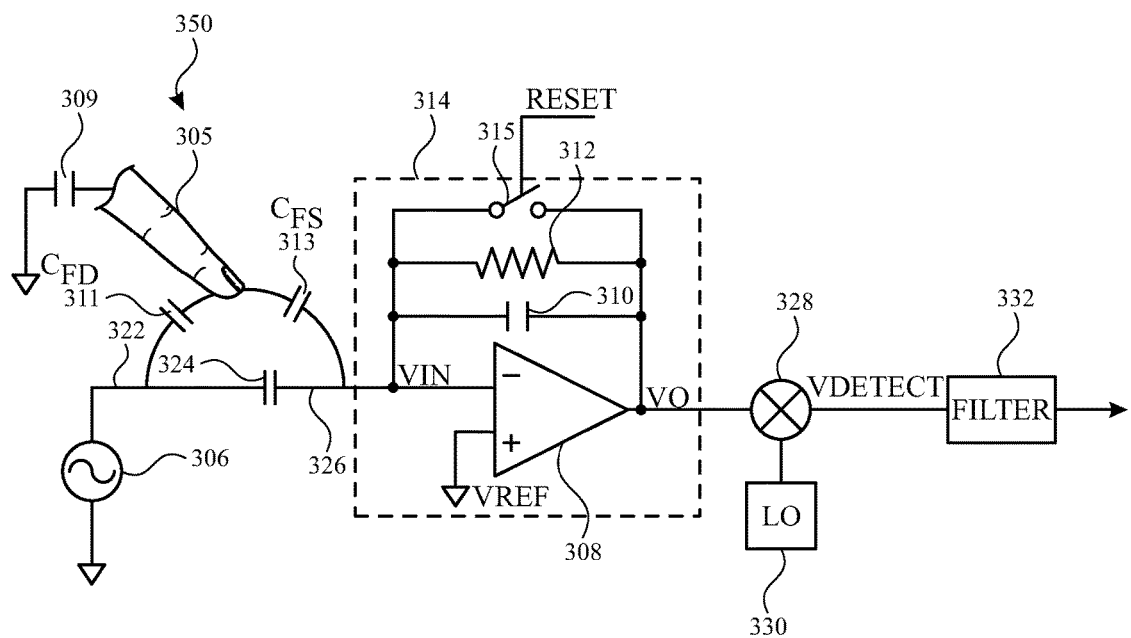
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$ and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
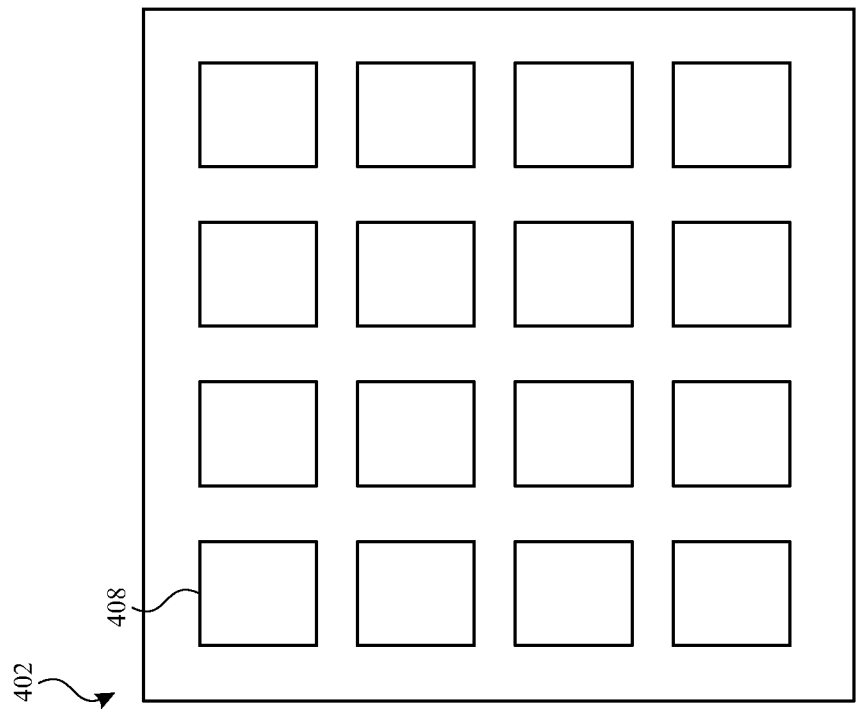
FIG. 4B illustrates touch screen with touch node electrodes arranged in a pixelated touch node electrode configuration according to examples of the disclosure.
Figure 4A:
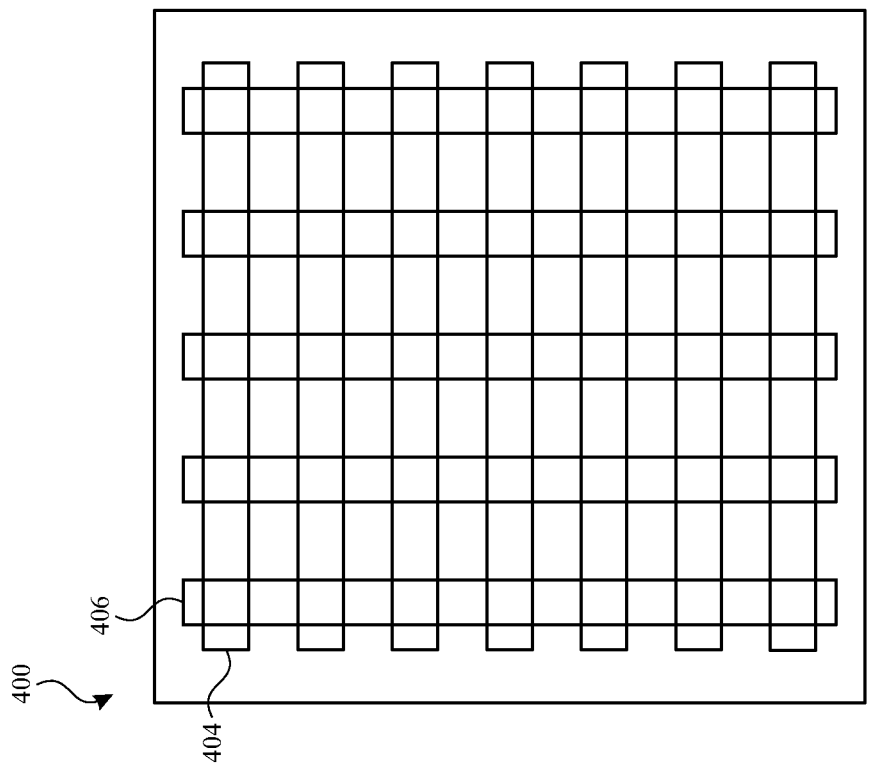
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. Although the touch electrodes 404 and 406 are illustrated as being rectangularly-shaped, it should be understood that other electrode shapes and structures (e.g., diamond-, square-, stripe- or circle-shaped electrodes connected by jumpers or vias) are possible.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. Although touch node electrodes 408 are illustrated as having rectangular shapes, it should be understood that other electrode shapes (e.g., diamonds, circles, stripes etc.) and structures are possible.

In some examples, a touch screen can concurrently display an image and detect objects touching or proximate to the surface of the touch screen. The electrical signals that an electronic device uses to display images on the touch screen can capacitively couple to the touch electrodes, creating noise in the touch data. Moreover, one or more additional components of the electronic device (e.g., a power system, one or more processors, etc.) can inject noise into the touch data. The electronic device can use the touch screen as an input device, such as by performing one or more functions in response to detecting input provided by the user at the touch screen. Thus, in some examples, when the noise in the touch data prevents the electronic device from accurately detecting the location, size, and shape of a touching or proximate object, user experience can suffer. Thus, it can be desirable to reduce the amount of noise present in the touch data to enable the electronic device to detect touching and proximate objects with improved accuracy.

Although some noise can be mitigated by providing insulating layers between the touch circuitry and other circuitry (e.g., display circuitry, power system circuitry, circuitry of one or more processors, etc.), adding insulation to the electronic device can increase the size of the electronic device, which can be undesirable for users, especially for portable electronic devices (e.g., mobile phones, media players, laptop computers, tablets, wearable devices, etc.). Thus, in some examples, data processing techniques can be used to remove the noise from the data before processing the detected touch and hover events.

Figure 5:
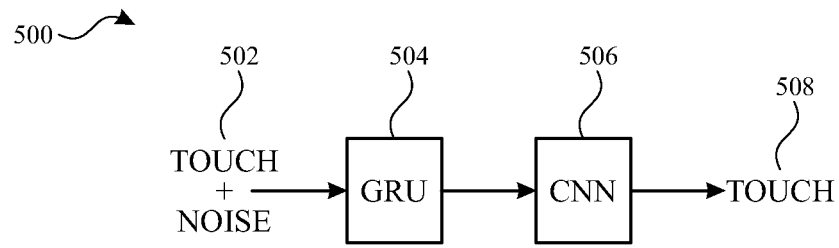
FIG. 5 illustrates an exemplary block diagram of a noise removal system according to some examples of the disclosure.

FIG. 5 illustrates an exemplary block diagram of a noise removal system 500 according to some examples of the disclosure. In some examples, the system 500 accepts touch data including noise 502 as an input and outputs touch data 508 with the noise removed or reduced. The system 500 can use machine learning techniques to reduce or remove noise from the touch data, for example. In some examples, the system 500 can include a gated recurrent unit (GRU) stage 504 followed by a convolutional neural network (CNN) stage 506. In some examples, the GRU stage 504 includes GRUs that are minimal GRUs, LSTMs, LiGRUs, Fast-GRUs, single directional GRUs, and/or sparse kernels GRUs. In some examples, the CNN stage 506 includes a separable convolutional neural network. The GRU stage 504 and the CNN stage 506 can be coupled in series or, in other words, the CNN stage 506 can accept the output of the GRU stage 504 as the input to the CNN stage 506.

System 500 can remove display-to-touch noise (e.g., noise caused by the display circuitry) and other noise (e.g., noise caused by other components, such as the power system, one or more processors, or other component(s) of the electronic device) from the touch data. For example, display-to-touch noise includes noise introduced into the touch data due to capacitive coupling of one or more conductive traces used to transmit electrical signals associated with displaying one or more images to one or more conductive traces and/or touch electrodes included in the touch sensing circuitry. In some examples, the GRU stage 504 can reduce or remove display-to-touch noise from the touch data 502. Thus, the output of the GRU stage 504 can be touch data that does not include display-to-touch noise (or includes significantly less display-to-touch noise than the amount of display-to-touch noise included in touch data and noise 502) but still includes noise from other sources, for example. In some examples, the output of the GRU stage 504 can be input to the CNN stage 506 and the CNN stage 506 can remove the noise from sources other than the display. In some examples, the CNN stage 506 can reduce noise on a localized, spatial basis, which can be well-suited for removing noise from other sources, such as random noise that is localized. As will be described in more detail below with reference to FIG. 6, the GRU stage 504 can be well-suited for reducing display-to-touch noise because both the display-to-touch noise and the GRU stage 504 can have a columnar structure. Thus, for example, the output of system 500 can be touch data 508 that does not include noise or includes significantly less noise than the amount of noise of the input touch data 502.

As will be described in more detail below, the GRU 504 can include a channel for each column (or row) of an image of touch captured by the touch screen of the electronic device and each channel can output a column (or row) of touch data with the display-to-touch noise reduced or removed from the touch data. The CNN stage 506 can either include a channel for each column (or row) of the image of touch or the columns (or rows) output by the GRU stage 504 can be combined into a touch image and the CNN stage 506 can estimate noise in the entire touch image. In some examples, the CNN stage 506 includes a CNN with one or more layers and each layer can include one or more filters. In some examples, the CNN stage 506 can be a combination of CNN layers. Individual layers can be regular CNN or separable convolution (e.g., for fast interference on the device), for example. In some examples, the CNN stage 506 includes one or more summers similar to summers 625 that allow the CNN stage to subtract the estimated noise from the touch data. Throughout the rest of this application, the GRU stage 504 will be described as removing or reducing noise using a column-by-column approach (e.g., the GRU stage 504 will be described as having a channel for each column), but it should be understood that, in some examples, the GRU stage 504 can use a row-by-row approach (e.g., the GRU stage 504 can have a channel for each row).

Figure 6:
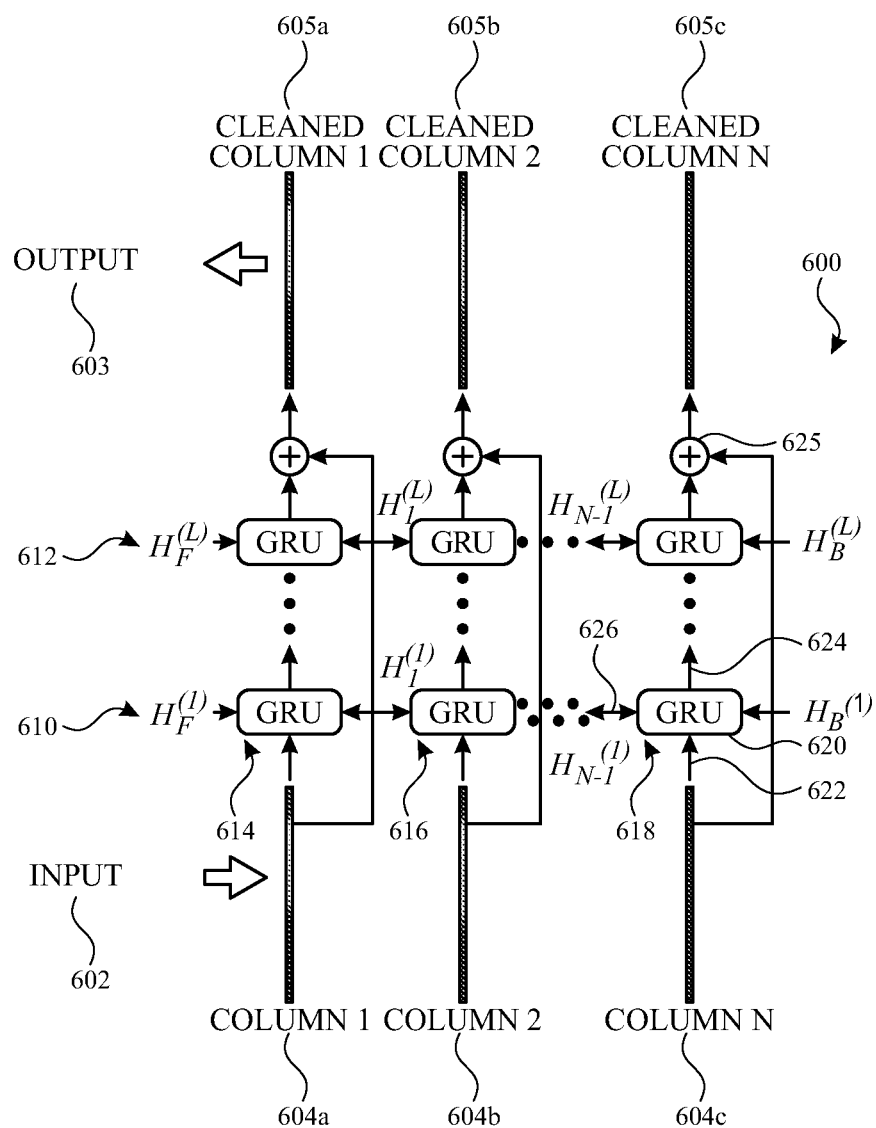
FIG. 6 illustrates a block diagram of an exemplary GRU stage of a noise removal system according to some examples of the disclosure.

FIG. 6 illustrates a block diagram of an exemplary GRU stage 600 of a noise removal system according to some examples of the disclosure. GRU stage 600 can be similar to GRU stage 504 and can similarly be used in system 500. As described above with reference to FIG. 5, the GRU stage 600 can accept touch data including noise as an input 602 and can produce touch data with display-to-touch noise removed as the output 603.

The GRU stage 600 can include a plurality of channels 614, 616, and 618, with one channel per column of touch data, for example. In some examples, the channels are communicatively arranged in the same way the columns of the touch data are spatially arranged. For example, the channel 614 that receives the leftmost column 604a of touch data as input is in communication with the channel 616 that receives the column 604b of touch data that is directly to the right of the leftmost column 604a of touch data. More generally, a respective channel that receives a respective column of touch data as input is in communication with the channel(s) that receive as input column(s) of data that are directly adjacent to the respective column. Thus, for example, if the touch data includes n columns of data, the GRU stage 600 can have n channels 614-616. In some examples, the spatial correlation of the GRU stage 600 can be advantageous for removing display-to-touch noise because display-to-touch noise can have a columnar structure. For example, one or more columns may have a relatively high amount of display-to-touch noise, with the magnitude of display to touch noise of the other columns being proportional to the proximity of those other columns to the columns with the maximum display-to-touch noise.

In some examples, each channel 614-616 can have a predetermined number of nodes 620, the number of units per channel 614-616, or layers, being denoted by "L". Each node 620 can accept an input 622 and a state 626 and produce an output 624 and a state 626. In some examples, the first layer can accept as input a vector with the same size as the number of measurements in each column, and the final layer can provide as output a vector with the same size as the number of measurements in each column. The layers in the middle can have inputs and outputs with different sizes, however. For example, the size of the vectors can be compressed in the middle of the GRU stage 600 to improve computational efficiency. As another example, the vectors in the middle of the GRU stage 600 can be augmented, if such augmentation is advantageous. In some examples, some middle layers have compressed vectors and other middle layers have augmented vectors. In some examples, all layers input and output vectors having the same size as the columns of touch data.

In some examples, GRU stage 600 can be spatially recurrent. As described above, each channel 614-616 can accept one column 604 of touch data with noise as an input and output a column 605 of touch data with display-to-touch noise removed, for example. In some examples, nodes 620 within the same layer (e.g., layer 610 or 612) can exchange states 626, thus providing each channel 614-618 with information related to the adjacent columns of touch data. Initial states $h_F^{(1)} \ldots h_F^{(L)}$ and $h_B^{(1)} \ldots h_B^{(L)}$ can be set to 0 or some other predetermined value or set based on calibration data, as will be described in more detail below. In some examples, the GRU 600 is a bi-directional GRU in that nodes 620 within each layer transfer states to both neighboring cells 620. For example, initial states $h_F^{(1)} \ldots h_F^{(L)}$ can be passed along each layer in a first (e.g., forward) direction (e.g., from left to right, as shown in FIG. 6) and initial states $h_B^{(1)} \ldots h_B^{(L)}$ can be passed along each layer in the opposite (e.g., backwards) direction (e.g., from right to left, as shown in FIG. 6). In some examples, the initial states are passed in one direction, then the other, and then the outputs of both directions are summed, averaged, or concatenated. The outputs 624 of the nodes 620 of the final layer 612 of the GRU stage 600, which can represent the display-to-touch noise in each column of touch data, can be combined with the input 102 at summer 625 to subtract the noise from the input 602. Thus, in some examples, each channel 614-618 can output a column 605a-c of touch data with display to touch noise removed (or significantly reduced).

Figure 7:
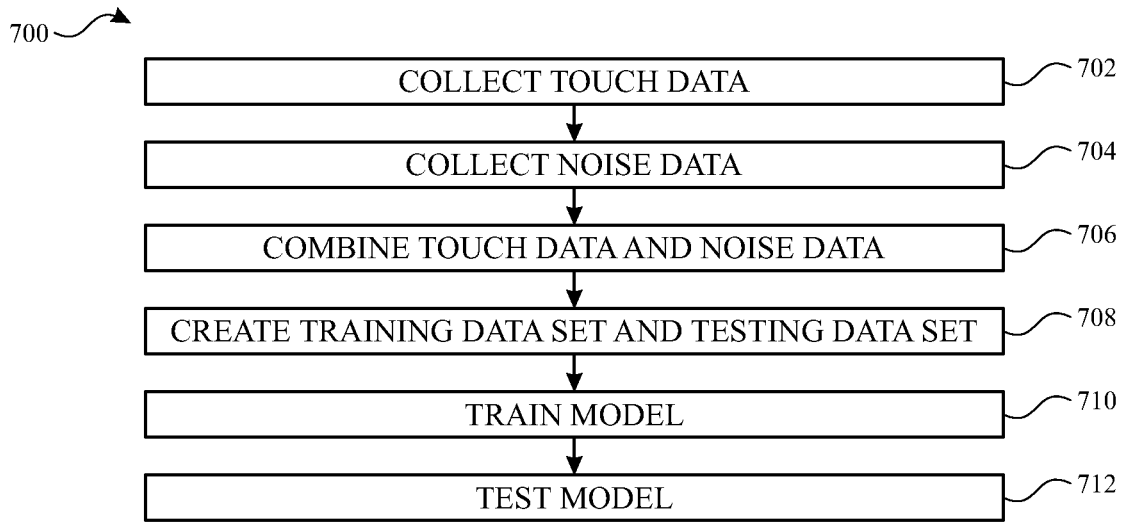
FIG. 7 illustrates an exemplary process for training a machine learning model for removing noise from touch data according to some examples of the disclosure.

FIG. 7 illustrates an exemplary process 700 for training a machine learning model for removing noise from touch data according to some examples of the disclosure. Process 700 can be performed by the manufacturer and/or designer of an electronic device to create a model for use in all units of the same design of electronic device. The GRU unit 504 or 600 and CNN unit 506 can have a number of parameters that can be set through training system 500 according to process 700, for example.

At 702, touch data can be collected. Collecting touch data can include instructing test users to perform a series of touch gestures on a number of test units with the touch sensing circuitry activated. In some examples, the display can be powered off, the charger of the power unit can be disconnected, and/or additional insulating material between the touch screen and other components of the electronic device can be installed so that the touch data includes minimal noise or no noise at all. The touch data can be collected with a plurality (e.g., around 400 or some other number) units. Collecting touch data from multiple users performing multiple gestures can provide the model with several touch data examples that can be used by the model to identify touch in various scenarios during operation.

At 704, noise data can be collected. Collecting noise data can include sensing touch data when no objects are touching the touch screen while the display displays a series of images and the other components of the electronic device (e.g., including the power charging system) are active. The captured touch data can include noise without including data indicative of touching and proximate objects.

At 706, the touch data collected at 702 and the noise data at 704 can be combined. The touch data collected at 702 (e.g., touch data without noise) and the noise data collected at 704 (e.g., noise data without touch) can be summed together to create noisy touch data similar to noisy touch data that will be collected by the touch circuitry of the electronic device while the electronic device is in use. In some examples, the noisy touch data and the touch data without noise (e.g., touch data collected at 702) can be stored together for the purpose of training and testing, as described below at 708-712.

At 708, a training data set and a testing data set can be created from the noisy touch data created at 706. A number of noisy touch data sets can be used for the purpose of training and the remaining data sets can be used to test the model. Preserving the association of the noisy touch data and the touch data without noise collected at 702 can make it possible to train and test the model at 710 and 712.

At 710, the model can be trained. To train the model, the model can be provided with an example of noisy touch data and the noise-free touch data associated with the respective example of noisy touch data. Several examples can be provided to the model. Because the noise-free touch data for each example is provided to the model, the model can tune its parameters to construct a model that accurately estimates the noise in each example by checking its performance for each example.

At 712, the model can be tested. To test the model, the model can be provided with noisy touch data and then the model's output can be compared to the noise-free touch data collected for the input noisy touch data. The differences between the model's output and the noise-free touch data can be compared to evaluate the accuracy of the model.

Once the model has been trained and tested, it can be installed on each unit of a respective model of electronic device. In some examples, the training and testing data can be collected from a number of units, thus generating a model with good performance for other units not included in the test group (e.g., units to be shipped to customers). That said, the accuracy of the model can be improved either by repeating process 700 for each unit (where touch data and noise data are collected at 702 and 704 only for the respective unit) or by performing a calibration procedure to tune the model built using test units, for example. In some examples, the latter approach can save time and money and may be preferable to the former approach.

Figure 8:
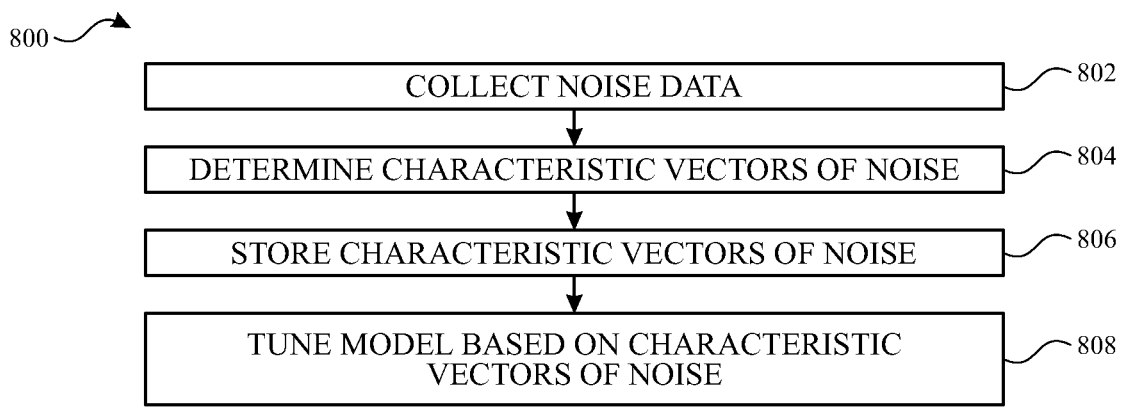
FIG. 8 illustrates an exemplary process for calibrating a noise-removal model for a respective electronic device unit according to some examples of the disclosure.

FIG. 8 illustrates an exemplary process 800 for calibrating a noise-removal model for a respective electronic device unit according to some examples of the disclosure. Process 800 can be used to calibrate a model, such as system 500 that was trained and tested according to one or more steps of process 700. In some examples, process 800 can be performed before the electronic device unit is shipped to the customer (e.g., at the factory) or can be performed on-demand in response to a user input.

At 802, noise data can be collected. For example, while there are no objects touching or proximate to the touch screen, the electronic device can be powered on and can display a number of calibration images while touch data is collected. The touch data can be stored for further use. In some examples, the touch data can include display noise. In some examples, the noise data can be collected while a charging system of the electronic device is not in use, thus, the noise data may not include noise caused by the charging system.

At 804, a plurality of characteristic vectors indicative of the noise data can be calculated. For example, the noise data can be analyzed using singular value decomposition. Singular value decomposition can be performed for each frame of noise data or all of the noise data can be concatenated, or otherwise combined and singular value decomposition can be performed on the entire noise data set. In some examples, characteristic vectors of the noise can be computed from the singular value decomposition of the noise data. The characteristic vectors are vectors that can be linearly combined to represent any noise pattern observed during the calibration process-thus, the characteristic vectors can be linearly combined to represent a large portion of display-to-touch noise patterns that are expected to occur at the respective electronic device unit. In some examples, the characteristic vectors can be the same for all columns of the touch screen. In some examples, the characteristic vectors can be different for each column of the touch screen.

At 806, the characteristic vectors of noise can be stored. In some examples, the relevance of the characteristic vectors can widely vary. Thus, the characteristic vectors can be ranked according to relevance and a predetermined number (e.g., 4, 5, 6, etc.) of most-relevant characteristic vectors can be stored. In some examples, however, all characteristic vectors are stored. In some examples, a plurality of characteristic vectors that can be used to construct the noise for all of the columns of the touch screen can be stored. In some examples, a plurality of characteristic vectors can be stored for each column of the touch screen in association with an indication of the respective column with which the plurality of characteristic vectors are associated.

At 808, the model and, more specifically, the GRU stage 504 or 600 can be tuned using the characteristic vectors (e.g., the predetermined number of most-relevant characteristic vectors). Tuning can be accomplished in a number of ways. Characteristic vectors can be used as initial states for one or more layers of the GRU unit 600, characteristic vectors can be concatenated with the touch data and the concatenation can be used as the input 602 to the GRU unit 600, and/or the characteristic vectors can be used to construct an attention layer, as will be described in more detail below with reference to FIG. 9. In some examples, as will be described below with reference to FIG. 11, the GRU stage 504 or 1100 can output a plurality of coefficients for each column that can be multiplied with the characteristic vectors to estimate the noise in the touch data. The electronic device can estimate the coefficients to be used to linearly combine the characteristic vectors to estimate the noise, for example.

In some examples, the characteristic vectors can be used as the initial states of the GRU unit 600. For example, one characteristic vector can be used for each layer of the GRU unit 600. As another example, one characteristic vector can be used for each layer of the GRU unit 600 until all saved characteristic vectors have been used. For example, if 4 characteristic vectors are stored and the model has 6 layers, characteristic vectors can be used as the initial states of the first four layers of the model and the initial state of the last two layers can be set to a predetermined value, such as 0. As another example, all of the stored characteristic vectors can be concatenated and provided to the first layer 610 as the initial state and the initial state of all other layers can be set to a predetermined value, such as 0.

In some examples, the characteristic vectors can be included in the input 602 to the GRU unit 600. For example, the noisy touch data and all stored characteristic vectors can be concatenated and the concatenated input 602 can be provided to the model.

In some examples, the input 602 can be modified in other ways. In some examples, the touch screen can be configured to sense touch using a plurality of sampling frequencies. For example, the touch screen can use a frequency hopping scheme to sense touch, or the touch frequency can be changed in response to detecting noise at the frequency that is currently in use. In some examples, the sampling frequency can be added to the input with the noisy touch data and the combined input 602 can be provided to the model. For example, the frequency can be encoded using one-hot encoding with predefined vectors and the vectors can be provided with the noisy touch data as input to the model.

Figure 9:
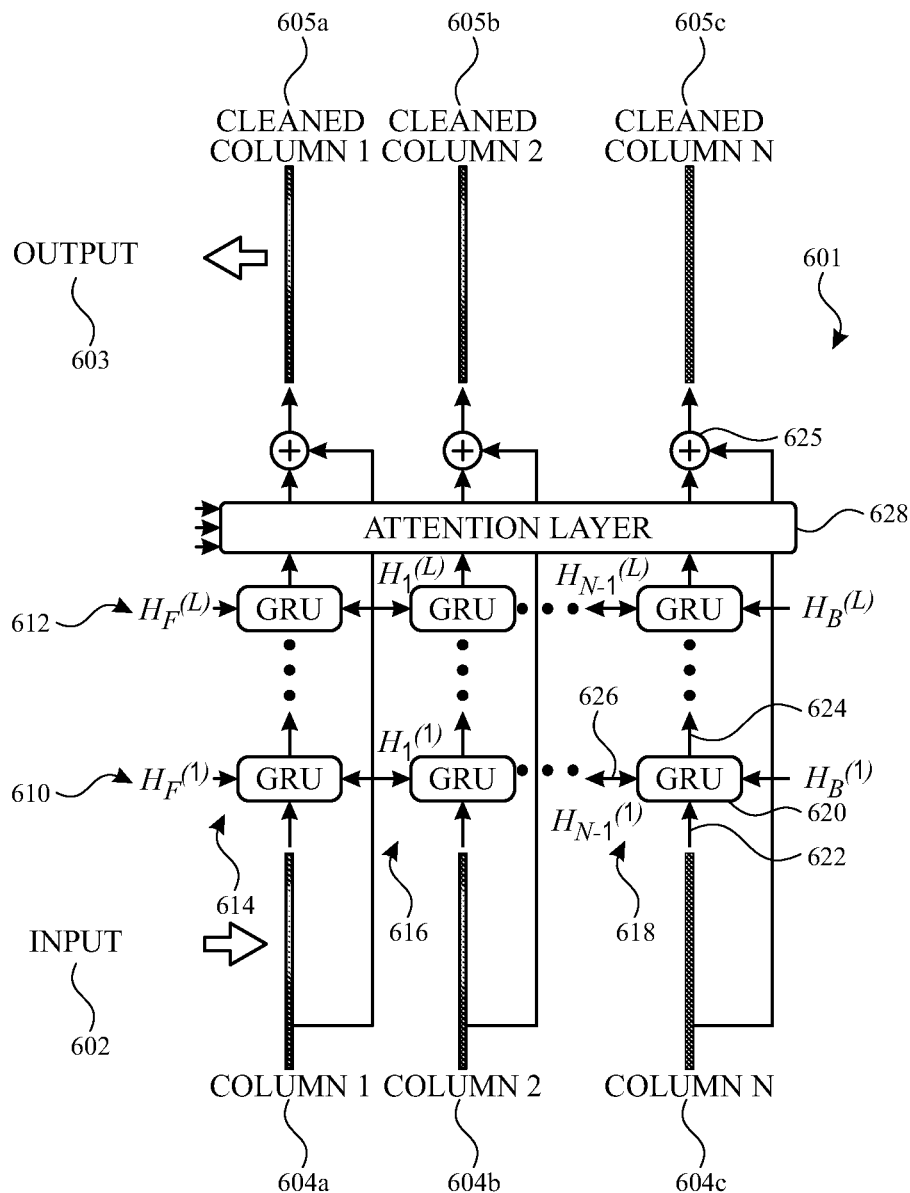
FIG. 9 illustrates an exemplary GRU stage of a noise reduction system according to some examples of the disclosure.

FIG. 9 illustrates an exemplary GRU stage 601 of a noise reduction system according to some examples of the disclosure. GRU stage 601 can include the same components as GRU stage 600 described above with reference to FIG. 6 with the addition of attention layer 628. In some examples, GRU stage 601 can be used as GRU stage 504 of system 500.

In some examples, attention layer 628 can be generated using the characteristic vectors determined at 804 of process 800. The predetermined number of most-relevant characteristic vectors can be concatenated and provided to a calibration GRU stage that is similar to GRU unit 600 but does not include summers 625. Thus, the calibration GRU stage can provide an estimation of characteristic noise of the electronic device unit, for example. In some examples, the estimation of the characteristic noise can be used to create an attention layer 628. The attention layer 628 can accept as input the outputs 624 of the final layer 612 of GRU stage 601 and provide its output to summers 625. Thus, the output of the attention layer 628 can be the estimation of display-to-touch noise of the input 602 to GRU stage 601. In some examples, the attention layer 628 is not the final layer in the GRU stage 601 and instead accepts the output of a layer other than the final layer 612 and provides its output to a subsequent layer of GRU nodes 620. In some examples, the attention layer 628 applies one or more scaling factors to one or more features identified by the rest of the GRU stage 601 to provide a more accurate estimation of display-to-touch noise and, thus, improved removal of noise from the touch data.

Figure 10:
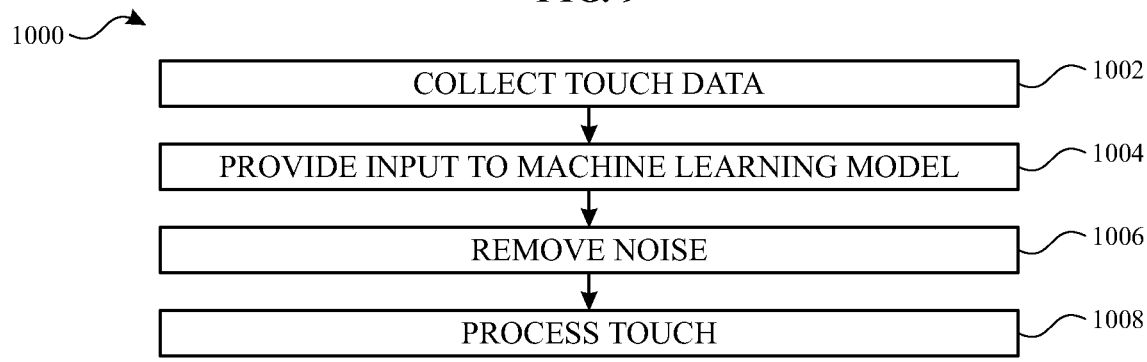
FIG. 10 illustrates an exemplary process of processing touch input at an electronic device according to some examples of the disclosure.

FIG. 10 illustrates an exemplary process 1000 of processing touch input at an electronic device according to some examples of the disclosure. Process 1000 can be performed with one or more examples described above with reference to FIGS. 1-9 and/or one or more examples described below with reference to FIGS. 11-12.

At 1002, touch data can be collected. Collecting touch data can include sensing touch at a touch screen (e.g., touch screen 124, 126, 128, 130, 132, 220, 400, or 402) or touch sensor panel 134 or 138 according to one or more examples described with reference to FIGS. 2-4.

At 1004, an input that includes the touch data can be provided to a machine learning model, such as system 500 that includes GRU stage 600 or 601. As described above, the input can further include an indication of the frequency at which the touch data was collected and/or one or more characteristic vectors of noise of the electronic device unit.

At 1006, the machine learning model (e.g., system 500) can remove noise from the touch data. For example, the GRU stage 504 can remove display-to-touch noise and the CNN stage 506 can remove other noise (e.g., noise caused by a charger of the electronic device's power system).

At 1008, the touch data with the noise removed can be processed. With the noise removed or reduced, the touch data can be used to determine the size, shape, and location of one or more objects touching or hovering near the touch screen. The electronic device can perform a variety of functions in response to detecting touching or hovering objects or gestures performed with touching or hovering objects. For example, in response to detecting a tap gesture in a respective region of a user interface displayed on the touch screen, the electronic device can perform a function associated with the respective region.

Figure 11:
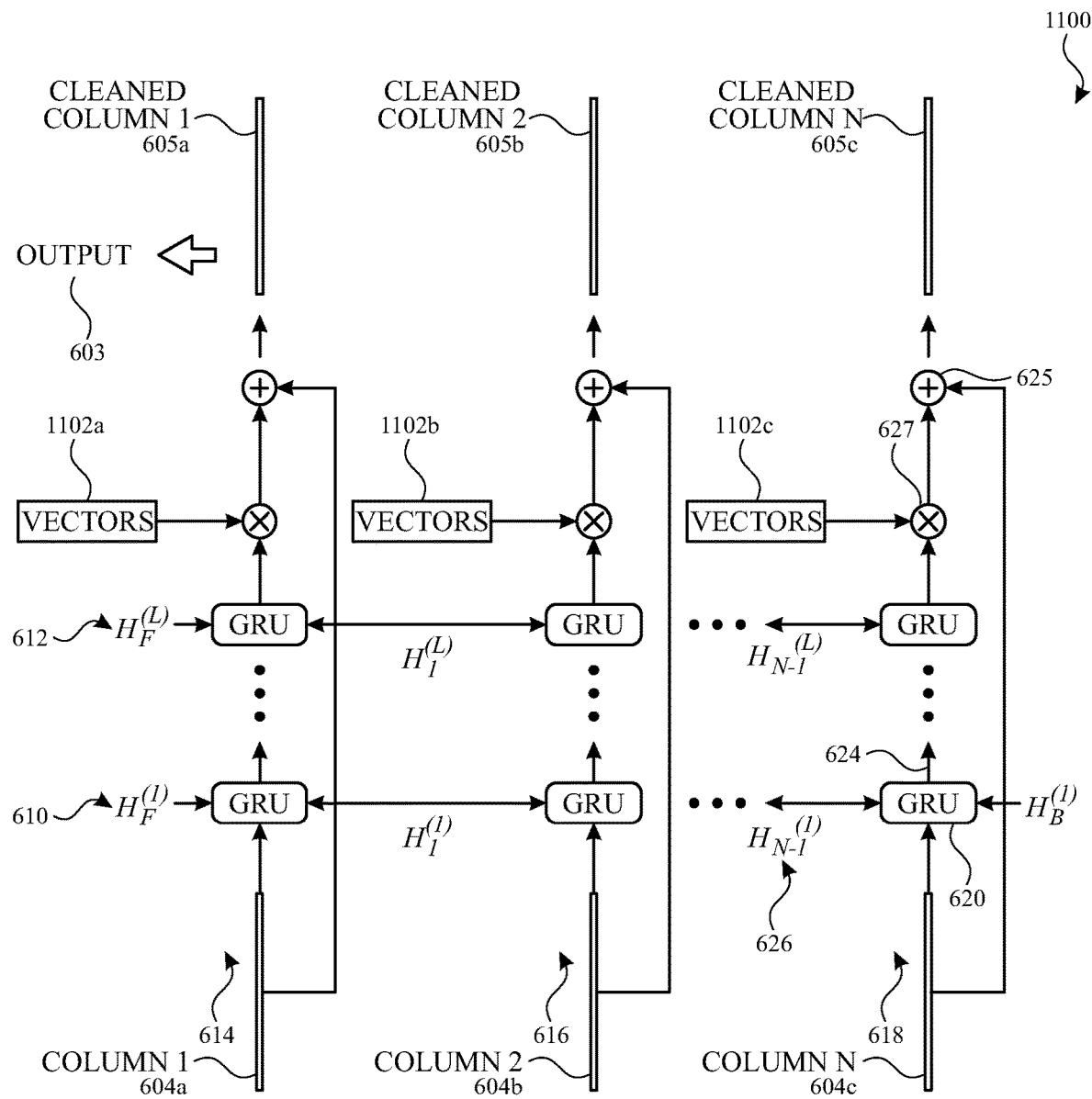
FIG. 11 illustrates a block diagram of an exemplary GRU stage of a noise removal system according to some examples of the disclosure.

FIG. 11 illustrates a block diagram of an exemplary GRU stage 1100 of a noise removal system according to some examples of the disclosure. In some examples, GRU stage 1100 can be the same as GRU stage 600 except for the differences described herein.

In some examples, the outputs 624 of the final layer 612 of GRU nodes 620 can be a plurality of scalar coefficients instead of a vector of estimated noise. The coefficients can be multiplied with vectors 1102a-c via multipliers 627, for example. In some examples, multipliers 627 can be hardware, firmware, or software components executed by one or more processors configured to multiply the each respective vector by a respective coefficient output by the final layer 612 of GRU nodes 620. In some examples, the vectors 1102a-c can be the characteristic vectors of noise described above with reference to FIG. 8. Vectors 1102a, 1102b, and 1102c can be the same characteristic vectors of noise collected for the respective electronic device in some examples. in some examples, vectors 1102a, 1102b, and 1102c can be different from each other and can each be unique to a respective column of a touch screen of the respective electronic device.

In some examples, each channel 614, 616, and 618 of the GRU stage 1100 can output a plurality of coefficients to be multiplied with the vectors 1102a-c. For example, if vectors 1102a-c each include four vectors, each channel 614, 616, and 618 can output four coefficients. For example, the first coefficient can be multiplied with the first vector, the second coefficient can be multiplied with the second vector, the third coefficient can be multiplied with the third vector, and the fourth coefficient can be multiplied with the fourth vector and the scaled vectors can be summed. In some examples, the sum of the scaled vectors can be an estimate of the noise included in the data 604a-c provided to the GRU stage 1100. The output of the multipliers 627 can be subtracted from (or, if the coefficients or vector values are negative, summed with) the input data 604a-c to result in output data 603 that includes columns 605a-c of touch data with some or all display noise removed.

In some examples, a GRU stage can include features of one or more of GRU stages 600, 601, and 1100. For example, a GRU stage can include attention layer 628 illustrated in FIG. 9 between the final layer 612 of GRU nodes 620 and the multipliers 627 and vectors 1102*a-c* illustrated in FIG. 11. In some examples, GRU stage 1100 can use the characteristic vectors as the initial states 626 of the GRU layers 610-612.

Figure 12:
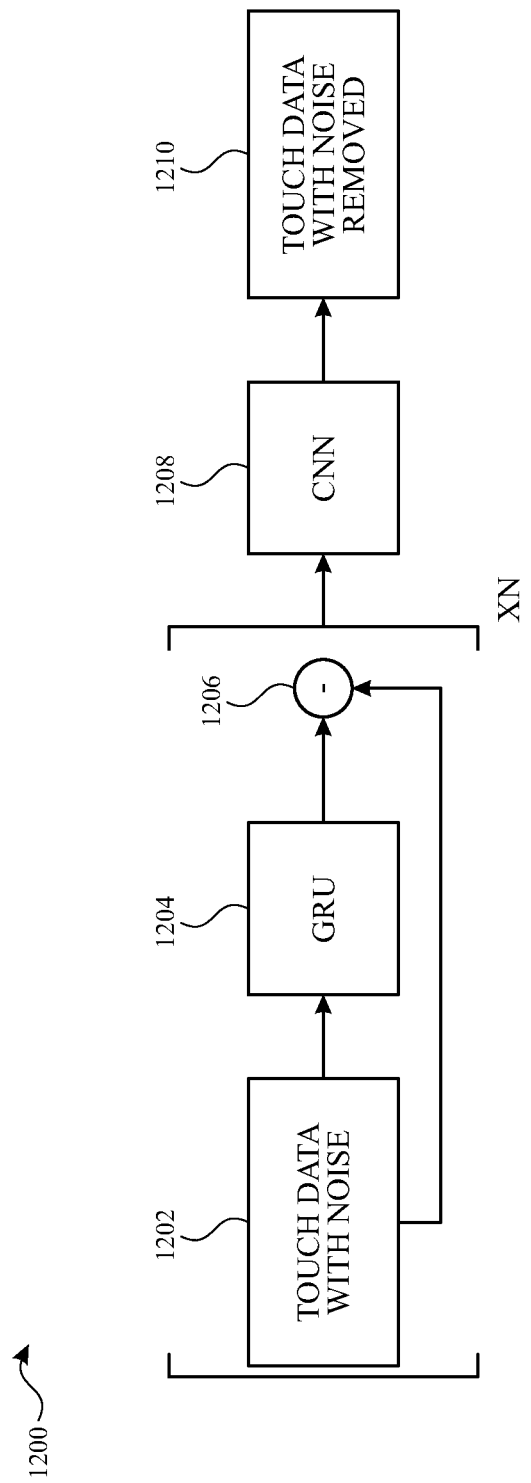
FIG. 12 illustrates a block diagram of an exemplary system of noise removal according to some examples of the disclosure.

FIG. 12 illustrates a block diagram of an exemplary system 1200 of noise removal according to some examples of the disclosure. In some examples, a single frame of touch data 1202 can be processed by a GRU stage 1204 (e.g., GRU stage 504, 600, 601, 1100) multiple times before the output of the GRU stage 1204 is provided to the CNN stage 1208. In some examples, GRU stage 1204 can be the same as GRU stages 504, 600, 601, 1100 or the same as GRU stages 504, 600, 601, and 1100, except GRU stage 1204 can include only one layer instead of a plurality of layers. The touch data 1202 can be provided to the GRU 1204 as described above with reference to FIGS. 5-11. For example, each column of touch data can be input to a channel of the GRU 1204. In some examples, the GRU 1204 can output an estimation of the noise included in the touch data 1202. The output of the GRU 1204 can be subtracted from the touch data 1202 by subtractor 1206, for example. In some examples, subtractor 1206 can be similar to summer 625.

In some examples, if the GRU stage 1204 has removed noise from the touch data 1202 fewer than N predetermined number of times, the output of the subtractor 1206 can be input to the GRU 1204 and noise removal can be repeated. The process of providing the output of the subtractor 1206 as the input to the GRU 1204 can be repeated N predetermined number of times, for example. In some examples, the number of times N that the GRU 1204 removes noise from one frame of data can be determined during a calibration process for the electronic device. In some examples, N can vary from model to model, production batch to production batch, or unit to unit of electronic devices.

In some examples, once the GRU 1204 has removed noise from the frame of data the N predetermined number of times, the output of the subtractor 1206 can be provided to the CNN 1208 and the CNN can output touch data 1210 with display noise and other noise removed, as described above with reference to FIG. 5. In some examples, however, CNN 1208 can be omitted and the final output of the subtractor 1206 can be touch data with noise removed 1210.

Therefore, according to the above, some examples of the disclosure are directed to a method comprising: obtaining first touch data representing output, sensed using one or more touch sensing electrodes of a touch sensitive surface, indicating one or more touches of the touch sensitive surface by one or more touch objects, wherein the first touch data includes data representing a first noise component and a second noise component; inputting the first touch data into a gated recurrent unit; removing, with the gated recurrent unit, the first noise from the first touch data to obtain second touch data that indicates the one or more touches of the touch sensitive surface by the one or more touch objects, wherein the second touch data includes the second noise; outputting, from the gated recurrent unit, the second touch data that includes the second noise; inputting the second touch data than includes the second noise to a convolutional neural network; removing, with the convolutional neural network, the second noise from the second touch data to obtain third touch data that indicates the one or more touches of the touch sensitive surface by the one or more touch objects; and outputting, from the convolutional neural network, the third touch data. Additionally or alternatively, in some examples the first touch data includes a number of one-dimensional arrays of touch data; the gated recurrent unit includes a number of channels equal to the number of one-dimensional arrays of the first touch data; and each respective one-dimensional array of the first touch data is input to each respective channel of the gated recurrent unit. Additionally or alternatively, in some examples the gated recurrent unit includes a plurality of layers, each layer including one node in each channel; each respective node outputs a state to one or more nodes of the same layer in channels adjacent to the channel of the respective node; and each respective node outputs an output to a node in the same channel as the respective node and in a layer that is adjacent to the layer of the respective node. Additionally or alternatively, in some examples the first noise is noise caused by operation of a display, and the second noise is noise caused by operation of a component other than the display. Additionally or alternatively, in some examples the method further includes, prior to inputting the first touch data that includes first noise and second noise into the gated recurrent unit, training the gated recurrent unit and convolutional neural network, wherein the training comprises sampling a plurality of touch sensitive surfaces while display components of the plurality of touch screens are powered off and objects are proximate to or touching the touch screens to obtain training touch data and testing touch data; sampling a plurality of touch sensitive surfaces while the display components of the plurality of touch screens are powered on and no objects are proximate to or touching the touch screens to obtain training noise data and testing noise data; combining the training touch data and the training noise data to create training data; combining the testing touch data and the testing noise data to create testing data. Additionally or alternatively, in some examples, prior to inputting the first touch data that includes first noise and second noise into the gated recurrent unit, performing a calibration procedure, the calibration procedure including: at a touch screen of an electronic device, while no objects are proximate to or touching the touch screen, displaying a plurality of images while sensing touch data to collect noise data; and calculating a plurality of characteristic vectors of the noise data for which the plurality of characteristic vectors can be linearly combined to model the noise data. Additionally or alternatively, in some examples the gated recurrent unit includes a plurality of nodes arranged in a plurality of channels and layers, and each node retains a state, and the method further comprises, prior to inputting the first touch data that includes first noise and second noise into the gated recurrent unit: providing nodes within a number of the layers with a characteristic vector as an initial state of the nodes within the number of the layers. Additionally or alternatively, in some examples the method further includes concatenating the plurality of characteristic vectors with the first touch data that includes the first noise and the second noise, wherein inputting the first touch data that includes the first noise and the second noise into the gated recurrent unit includes inputting the concatenation of the characteristic vectors and the first touch data that includes the first noise and the second noise into the gated recurrent unit. Additionally or alternatively, in some examples the gated recurrent unit includes a plurality of nodes arranged in a plurality of channels and layers, and each node retains a state, and the method further comprises, prior to inputting the first touch data that includes first noise and second noise into the gated recurrent unit: concatenating the characteristic vectors; and providing the concatenation of the characteristic vectors to a first layer of the gated recurrent unit as an initial state of the first layer. Additionally or alternatively, in some examples the method further includes, prior to inputting the touch data that includes the first noise and the second noise into the gated recurrent unit: concatenating the characteristic vectors; inputting the concatenation of the characteristic vectors into a calibration gated recurrent unit; and providing an output of the calibration gated recurrent unit to an attention layer of the gated recurrent unit. Additionally or alternatively, in some examples the method further includes, prior to inputting the first touch data that includes the first noise and the second noise into the gated recurrent unit: sensing the first touch data using a respective sampling frequency of a plurality of sampling frequencies; concatenating the respective sampling frequency with the first touch data that includes the first noise and the second noise, wherein inputting the first touch data that includes the first noise and the second noise into the gated recurrent unit includes inputting the concatenation of the respective sampling frequency and the first touch data that includes the first noise and the second noise into the gated recurrent unit. Additionally or alternatively, in some examples wherein the gated recurrent unit is a minimal gated recurrent unit. Additionally or alternatively, in some examples the gated recurrent unit is spatially recurrent. Additionally or alternatively, in some examples, the convolutional neural network is a separable convolutional neural network. Additionally or alternatively, in some examples the method further includes determining one or more touches using the third touch data outputted from the convolutional neural network.

Some examples of the disclosure are directed to an electronic device including one or more processors storing instructions that, when executed, cause the electronic device to perform a method comprising: obtaining first touch data representing output, sensed using one or more touch sensing electrodes of a touch sensitive surface, indicating one or more touches of the touch sensitive surface by one or more touch objects, wherein the first touch data includes data representing a first noise component and a second noise component; inputting the first touch data that includes first noise and second noise into a gated recurrent unit; removing, with the gated recurrent unit, the first noise from the first touch data to obtain second touch data that indicates the one or more touches of the touch sensitive surface by the one or more touch objects, wherein the second touch data includes the second noise; outputting, from the gated recurrent unit, the second touch data that includes the second noise; inputting the second touch data that includes the second noise to a convolutional neural network; removing, with the convolutional neural network, the second noise from the second touch data to obtain third touch data that indicates the one or more touches of the touch sensitive surface by the one or more touch objects; and outputting, from the convolutional neural network, the third touch data.

Some examples of the disclosure are directed to a non-transitory computer-readable medium comprising instructions that, when executed by one or more processors of an electronic device comprising a touch screen, cause the electronic device to perform a method comprising: obtaining first touch data representing output, sensed using one or more touch sensing electrodes of a touch sensitive surface, indicating one or more touches of the touch sensitive surface by one or more touch objects, wherein the first touch data includes data representing a first noise component and a second noise component; inputting the first touch data that includes first noise and second noise into a gated recurrent unit; removing, with the gated recurrent unit, the first noise from the first touch data to obtain second touch data that indicates the one or more touches of the touch sensitive surface by the one or more touch objects, wherein the second touch data includes the second noise; outputting, from the gated recurrent unit, the second touch data that includes the second noise; inputting the second touch data that includes the second noise to a convolutional neural network; removing, with the convolutional neural network, the second noise from the second touch data to obtain third touch data that indicates the one or more touches of the touch sensitive surface by the one or more touch objects; and outputting, from the convolutional neural network, the third touch data.

Some examples of the disclosure are directed to a method comprising: obtaining first touch data representing output sensed using one or more touch sensing electrodes of a touch screen of an electronic device, the first touch data indicating one or more touches of the touch screen by one or more touch objects, wherein the first touch data includes data representing a first noise component; inputting the first touch data into a gated recurrent unit; estimating, using the gated recurrent unit, a plurality of coefficients; scaling a plurality of predetermined vectors with the plurality of coefficients; and summing the scaled vectors to obtain an estimation of the first noise component. Additionally or alternatively, in some examples, the method further includes, prior to obtaining the first touch data, at the touch screen of the electronic device, while no objects are proximate to or touching the touch screen, displaying a plurality of images while sensing calibration touch data to collect calibration noise data; calculating a plurality of characteristic vectors of the noise data, wherein the sum of the plurality of characteristic vectors scaled with respective coefficients results in an estimation of the noise data; and storing the plurality of characteristic vectors as the predetermined vectors. Additionally or alternatively, in some examples, calculating the plurality of characteristic vectors includes calculating a respective plurality of characteristic vectors for each respective sense line of the touch screen of the electronic device, and storing the plurality of characteristic vectors includes storing the respective pluralities of characteristic vectors in association with a respective sense line with which each respective plurality of characteristic vectors is associated. Additionally or alternatively, in some examples, estimating the plurality of coefficients includes estimating a respective plurality of coefficients for each sense line of the touch screen; and scaling the plurality of predetermined vectors includes scaling a respective plurality of vectors associated with a respective sense line of the touch screen with a respective plurality of coefficients associated with the respective sense line. Additionally or alternatively, in some examples, the plurality of predetermined vectors include a respective plurality of vectors for each respective sense line of the touch screen of the electronic device. Additionally or alternatively, in some examples, the method further includes subtracting the estimation of the first noise component from the first touch data to obtain second touch data; inputting the second touch data into the gated recurrent unit; and repeating the steps of estimating the plurality of coefficients, scaling the plurality of predetermined vectors, and summing the scaled vectors.

Some examples are directed to an electronic device, comprising: a touch screen; and one or more processors configured to perform a method comprising: obtaining first touch data representing output sensed using one or more touch sensing electrodes of the touch screen of the electronic device, the first touch data indicating one or more touches of the touch screen by one or more touch objects, wherein the first touch data includes data representing a first noise component; inputting the first touch data into a gated recurrent unit; estimating, using the gated recurrent unit, a plurality of coefficients; scaling a plurality of predetermined vectors with the plurality of coefficients; and summing the scaled vectors to obtain an estimation of the first noise component. Additionally or alternatively, in some examples, the method further comprises, prior to obtaining the first touch data: at the touch screen of the electronic device, while no objects are proximate to or touching the touch screen, displaying a plurality of images while sensing calibration touch data to collect calibration noise data; calculating a plurality of characteristic vectors of the noise data, wherein the sum of the plurality of characteristic vectors scaled with respective coefficients results in an estimation of the noise data; and storing the plurality of characteristic vectors as the predetermined vectors. Additionally or alternatively, in some examples, calculating the plurality of characteristic vectors includes calculating a respective plurality of characteristic vectors for each respective sense line of the touch screen of the electronic device, and storing the plurality of characteristic vectors includes storing the respective pluralities of characteristic vectors in association with a respective sense line with which each respective plurality of characteristic vectors is associated. Additionally or alternatively, in some examples, estimating the plurality of coefficients includes estimating a respective plurality of coefficients for each sense line of the touch screen; and scaling the plurality of predetermined vectors includes scaling a respective plurality of vectors associated with a respective sense line of the touch screen with a respective plurality of coefficients associated with the respective sense line. Additionally or alternatively, in some examples, the plurality of predetermined vectors include a respective plurality of vectors for each respective sense line of the touch screen of the electronic device. Additionally or alternatively, in some examples, the method further comprises: subtracting the estimation of the first noise component from the first touch data to obtain second touch data; inputting the second touch data into the gated recurrent unit; and repeating the steps of estimating the plurality of coefficients, scaling the plurality of predetermined vectors, and summing the scaled vectors.

Some examples are directed to a non-transitory computer readable medium storing instructions that, when executed by an electronic device including a touch screen and one or more processors, causes the electronic device to perform a method comprising: obtaining first touch data representing output sensed using one or more touch sensing electrodes of the touch screen of the electronic device, the first touch data indicating one or more touches of the touch screen by one or more touch objects, wherein the first touch data includes data representing a first noise component; inputting the first touch data into a gated recurrent unit; estimating, using the gated recurrent unit, a plurality of coefficients; scaling a plurality of predetermined vectors with the plurality of coefficients; and summing the scaled vectors to obtain an estimation of the first noise component. Additionally or alternatively, in some examples, the method further comprises, prior to obtaining the first touch data, at the touch screen of the electronic device, while no objects are proximate to or touching the touch screen, displaying a plurality of images while sensing calibration touch data to collect calibration noise data; calculating a plurality of characteristic vectors of the noise data, wherein the sum of the plurality of characteristic vectors scaled with respective coefficients results in an estimation of the noise data; and storing the plurality of characteristic vectors as the predetermined vectors. Additionally or alternatively, in some examples, calculating the plurality of characteristic vectors includes calculating a respective plurality of characteristic vectors for each respective sense line of the touch screen of the electronic device, and storing the plurality of characteristic vectors includes storing the respective pluralities of characteristic vectors in association with a respective sense line with which each respective plurality of characteristic vectors is associated. Additionally or alternatively, in some examples, estimating the plurality of coefficients includes estimating a respective plurality of coefficients for each sense line of the touch screen; and scaling the plurality of predetermined vectors includes scaling a respective plurality of vectors associated with a respective sense line of the touch screen with a respective plurality of coefficients associated with the respective sense line. Additionally or alternatively, in some examples, the plurality of predetermined vectors include a respective plurality of vectors for each respective sense line of the touch screen of the electronic device. Additionally or alternatively, in some examples, the method further comprises: subtracting the estimation of the first noise component from the first touch data to obtain second touch data; inputting the second touch data into the gated recurrent unit; and repeating the steps of estimating the plurality of coefficients, scaling the plurality of predetermined vectors, and summing the scaled vectors.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An electronic device comprising:
one or more processors configured to execute software that causes the electronic device to:
obtain first touch data representing output, sensed using one or more touch sensing electrodes of a touch sensitive surface, indicating one or more touches of the touch sensitive surface by one or more touch objects, wherein the first touch data includes data representing a first noise;
input the first touch data into a gated recurrent unit implemented by the one or more processors executing the software;
remove, with the gated recurrent unit, the first noise from the first touch data to obtain second touch data that indicates the one or more touches of the touch sensitive surface by the one or more touch objects; and
output, from the gated recurrent unit, the second touch data.

2. The electronic device of claim 1, wherein:
the first touch data includes a number of one-dimensional arrays of touch data;
the gated recurrent unit includes a number of channels equal to the number of one-dimensional arrays of the first touch data; and
each respective one-dimensional array of the first touch data is input to each respective channel of the gated recurrent unit.

3. The electronic device of claim 2, wherein:
the gated recurrent unit includes a plurality of layers, each layer including one node in each channel;
each respective node outputs a state to one or more nodes of the same layer in channels adjacent to a channel of a respective node; and
each respective node outputs an output to a node in a same channel as the respective node and in a layer that is adjacent to a layer of the respective node.

4. The electronic device of claim 1, wherein:
the first noise is noise caused by operation of a display.

5. The electronic device of claim 1, wherein the software further causes the electronic device to, prior to inputting the first touch data that includes first noise into the gated recurrent unit, train the gated recurrent unit, wherein training the gated recurrent unit comprises:
sampling a plurality of touch sensitive surfaces while display components of the plurality of touch sensitive surfaces are powered off and objects are proximate to or touching the touch sensitive surfaces to obtain training touch data and testing touch data;
sampling the plurality of touch sensitive surfaces while the display components of the plurality of touch sensitive surfaces are powered on and no objects are proximate to or touching the plurality of touch sensitive surfaces to obtain training noise data and testing noise data;
combining the training touch data and the training noise data to create training data; and
combining the testing touch data and the testing noise data to create testing data.

6. The electronic device of claim 1, wherein the software further causes the electronic device to, prior to inputting the first touch data that includes first noise into the gated recurrent unit, perform a calibration procedure, the calibration procedure including:
at a touch screen of the electronic device, while no objects are proximate to or touching the touch screen, displaying a plurality of images while sensing touch data to collect noise data; and
calculating a plurality of characteristic vectors of the noise data for which the plurality of characteristic vectors are linearly combined to model the noise data.

7. The electronic device of claim 6, wherein the gated recurrent unit includes a plurality of nodes arranged in a plurality of channels and layers, and each node retains a state, and the software further causes the electronic device to, prior to inputting the first touch data that includes the first noise into the gated recurrent unit:
providing nodes within a number of the layers with a characteristic vector as an initial state of the nodes within the number of the layers.

8. The electronic device of claim 6, wherein the software further causes the electronic device to:
concatenate the plurality of characteristic vectors with the first touch data that includes the first noise, wherein inputting the first touch data that includes the first noise into the gated recurrent unit includes inputting the concatenation of the characteristic vectors and the first touch data that includes the first noise into the gated recurrent unit.

9. The electronic device of claim 6, wherein the gated recurrent unit includes a plurality of nodes arranged in a plurality of channels and layers, and each node retains a state, and the software further causes the electronic device to, prior to inputting the first touch data that includes first noise into the gated recurrent unit:
concatenate the characteristic vectors; and
provide the concatenation of the characteristic vectors to a first layer of the gated recurrent unit as an initial state of the first layer.

10. The electronic device of claim 6, wherein the software further causes the electronic device to, prior to inputting the touch data that includes the first noise into the gated recurrent unit:
concatenate the characteristic vectors;

input the concatenation of the characteristic vectors into a calibration gated recurrent unit; and
provide an output of the calibration gated recurrent unit to an attention layer of the gated recurrent unit.

11. The electronic device of claim 1, wherein the software further causes the electronic device to, prior to inputting the first touch data that includes the first noise into the gated recurrent unit:
sense the first touch data using a respective sampling frequency of a plurality of sampling frequencies; and
concatenate the respective sampling frequency with the first touch data that includes the first noise, wherein inputting the first touch data that includes the first noise into the gated recurrent unit includes inputting the concatenation of the respective sampling frequency and the first touch data that includes the first noise into the gated recurrent unit.

12. The electronic device of claim 1, wherein the gated recurrent unit is a minimal gated recurrent unit.

13. The electronic device of claim 1, wherein the gated recurrent unit is spatially recurrent.

14. The electronic device of claim 1, wherein removal of the first noise from the first touch data to obtain the second touch data with the gated recurrent unit further comprises:
estimate, using the gated recurrent unit, a plurality of coefficients;
scale a plurality of predetermined vectors with the plurality of coefficients to obtain scaled vectors; and
sum the scaled vectors to obtain an estimation of the first noise.

15. A method, implemented by one or more processors executing software, comprising:
obtaining first touch data representing output, sensed using one or more touch sensing electrodes of a touch sensitive surface, indicating one or more touches of the touch sensitive surface by one or more touch objects, wherein the first touch data includes data representing a first noise;
inputting the first touch data that includes the first noise into a gated recurrent unit implemented by the one or more processors executing the software;
removing, with the gated recurrent unit, the first noise from the first touch data to obtain second touch data that indicates the one or more touches of the touch sensitive surface by the one or more touch objects; and
outputting, from the gated recurrent unit, the second touch data.

16. The method of claim 15, wherein:
the first touch data includes a number of one-dimensional arrays of touch data;
the gated recurrent unit includes a number of channels equal to the number of one-dimensional arrays of the first touch data; and
each respective one-dimensional array of the first touch data is input to each respective channel of the gated recurrent unit.

17. A non-transitory computer-readable medium comprising software instructions that, when executed by one or more processors of an electronic device comprising a touch screen, cause the electronic device to:
obtain first touch data representing output, sensed using one or more touch sensing electrodes of a touch sensitive surface, indicating one or more touches of the touch sensitive surface by one or more touch objects, wherein the first touch data includes data representing a first noise;

input the first touch data into a gated recurrent unit implemented by the one or more processors executing the software;

remove, with the gated recurrent unit, the first noise from the first touch data to obtain second touch data that indicates the one or more touches of the touch sensitive surface by the one or more touch objects; and output, from the gated recurrent unit, the second touch data.

18. The non-transitory computer-readable medium of claim 17, wherein:

the first touch data includes a number of one-dimensional arrays of touch data;

the gated recurrent unit includes a number of channels equal to the number of one-dimensional arrays of the first touch data; and each respective one-dimensional array of the first touch data is input to each respective channel of the gated recurrent unit.

19. The non-transitory computer-readable medium of claim 18, wherein:

the gated recurrent unit includes a plurality of layers, each layer including one node in each channel;

each respective node outputs a state to one or more nodes of the same layer in channels adjacent to a channel of a respective node; and each respective node outputs an output to a node in a same channel as the respective node and in a layer that is adjacent to a layer of the respective node.

20. The non-transitory computer-readable medium of claim 17, wherein:

the first noise is noise caused by operation of a display.

* * * * *